(12) United States Patent
Qin

(10) Patent No.: US 7,953,756 B1
(45) Date of Patent: May 31, 2011

(54) UNIFIED HIGH-PERFORMANCE DATABASE CONNECTIVITY SYSTEM AND METHOD

(75) Inventor: Johnson Ji Ahui Qin, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 561 days.

(21) Appl. No.: 12/048,192

(22) Filed: Mar. 13, 2008

Related U.S. Application Data

(63) Continuation of application No. 10/215,506, filed on Aug. 9, 2002, now Pat. No. 7,349,900.

(51) Int. Cl.
*G06F 17/30* (2006.01)
(52) U.S. Cl. ......... 707/791; 707/802; 707/822; 707/828
(58) Field of Classification Search ........... 707/600–831
See application file for complete search history.

(56) References Cited

U.S. PATENT DOCUMENTS

| | | | |
|---|---|---|---|
| 5,937,159 A | 8/1999 | Meyers et al. | |
| 6,138,120 A | 10/2000 | Gongwer et al. | |
| 6,393,468 B1 | 5/2002 | McGee | |
| 6,999,956 B2 * | 2/2006 | Mullins | 1/1 |

\* cited by examiner

*Primary Examiner* — Isaac M Woo
(74) *Attorney, Agent, or Firm* — Stolowitz Ford Cowger LLP

(57) ABSTRACT

The present invention utilizes a comprehensive object oriented software architecture that is flexibly extendible to accommodate numerous features and activities associated database connectivity including opening a database session, tracking information associated with the database session and closing the database session. An automated unified database connectivity method controls and automatically manages database connectivity information. Database credentials are prepared. A database connectivity session manager object is created. A database session connection is opened automatically based upon the database connectivity session manager object. A database service action is performed. When finished the database session connectivity is automatically closed.

20 Claims, 7 Drawing Sheets

UNIFIED HIGH-PERFORMANCE DATABASE CONNECTIVITY SYSTEM AND METHOD

RELATED APPLICATIONS

This application is a continuation of U.S. patent application Ser. No. 10/215,506, issued as U.S. Pat. No. 7,349,900, filed Aug. 9, 2002 which is incorporated by reference.

FIELD OF THE INVENTION

This invention relates to the field of database connectivity. In particular, the present invention relates to an automated unified high-performance database connectivity system and method.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Systems providing these advantageous results often include information stored in a variety of databases. Typically the database applications are distributed over numerous entities. However, traditional attempts at efficiently managing the connectivity of a wide variety of databases to numerous entities are cumbersome and consume significant resources.

Software programs typically include instructions that direct the functions of a processor device in the performance of useful tasks. The utility of a software program often depends upon the quality of available information such as how advanced and recent the information is.

Information is typically directed to supporting performance of complex functions and is being developed at exponentially increasing rates. Efficient and convenient connectivity to new information is very important for enabling users to experience the benefits of the latest information.

Managing the connectivity to information databases is often a very complicated and tedious endeavor. There are a lot of different connection activities and database applications that different databases such as Open Database Connectivity (ODBC), Sybase, Structured Query Language (SQL) Server, etc. and are limited to C/C++ language applications. Java Database Connectivity (JDBC) applications are traditionally fairly powerful. Their architecture and approaches are much more open and scalable than other traditional connectivity tools. The JDBC applications are relatively widely accepted by a majority of software vendors (such as Oracle, Sybase, etc.) running on a variety of operating systems (e.g., Unix, MS Windows, etc.). One primary advantage of JAVA JDBC is that Java only needs to provide one JDBC implementation since JAVA is a "Write Once, Run Anywhere" approach. However, traditional JDBC approaches typically require the applications to be Java-based when utilizing JDBC to perform database information query and update operations.

The vast amount of activities that potentially impact connectivity often make management of database connectivity very difficult. Prior attempts at connectivity typically lack desirable scaleability, integration and automation features. In the past, vast connectivity information from various activities that impact database access was not typically integrated in a structured and coordinated manner. For example, requisite information that impacts connectivity is not integrated across different database resources in traditional connectivity approaches making desirable automated convenient access very difficult to realize.

What is required is a system and method that facilitates unified database connectivity including automated integration of information associated with accessing various databases.

SUMMARY

The present invention is a unified database connectivity system and method that facilitates efficient and effective management of database connectivity and session information. A present invention unified database connectivity system and method permits flexible connectivity to various types of databases and associated information. The present system and method utilizes a comprehensive object-oriented unified database connectivity (UDBC) framework architecture which is flexibly extensible and scaleable to accommodate numerous database features and activities. In one embodiment of the present invention, the UDBC activities are language independent, facilitate maximization of application performance, compatible with a distributed information technology (IT) infrastructure, compliant with a variety of open standards and provide a foundation for a diversified enterprise architecture across different computer platforms.

In one embodiment, the present invention utilizes a comprehensive object oriented software architecture that is flexibly extendible to accommodate numerous features and activities associated database connectivity including opening a database session, tracking information associated with the database session and closing the database session. An automated unified database connectivity method controls and automatically manages database connectivity information. Database credentials are prepared and a database connectivity session manager object is created. A database session connection is opened automatically based upon the database connectivity session manager object. After connection a database service action (e.g., a query, an update, a record creation) is performed. When finished the database session connectivity is automatically closed.

DETAILED DESCRIPTION

Reference will now be made in detail to the preferred embodiments of the invention, a unified database connectivity system and method, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention is a unified database connectivity system and method that facilitates efficient and effective distribution of software. A present invention database connectivity system and method permits a flexible combination of a number of different characteristics and information associated with database connectivity and session activities. For example, in one embodiment, a present invention connectivity system and method enables automatic database connectivity to a wide variety of databases while coordinating, correlating and collecting information that assists database session management and maintenance activities.

Figure 1:
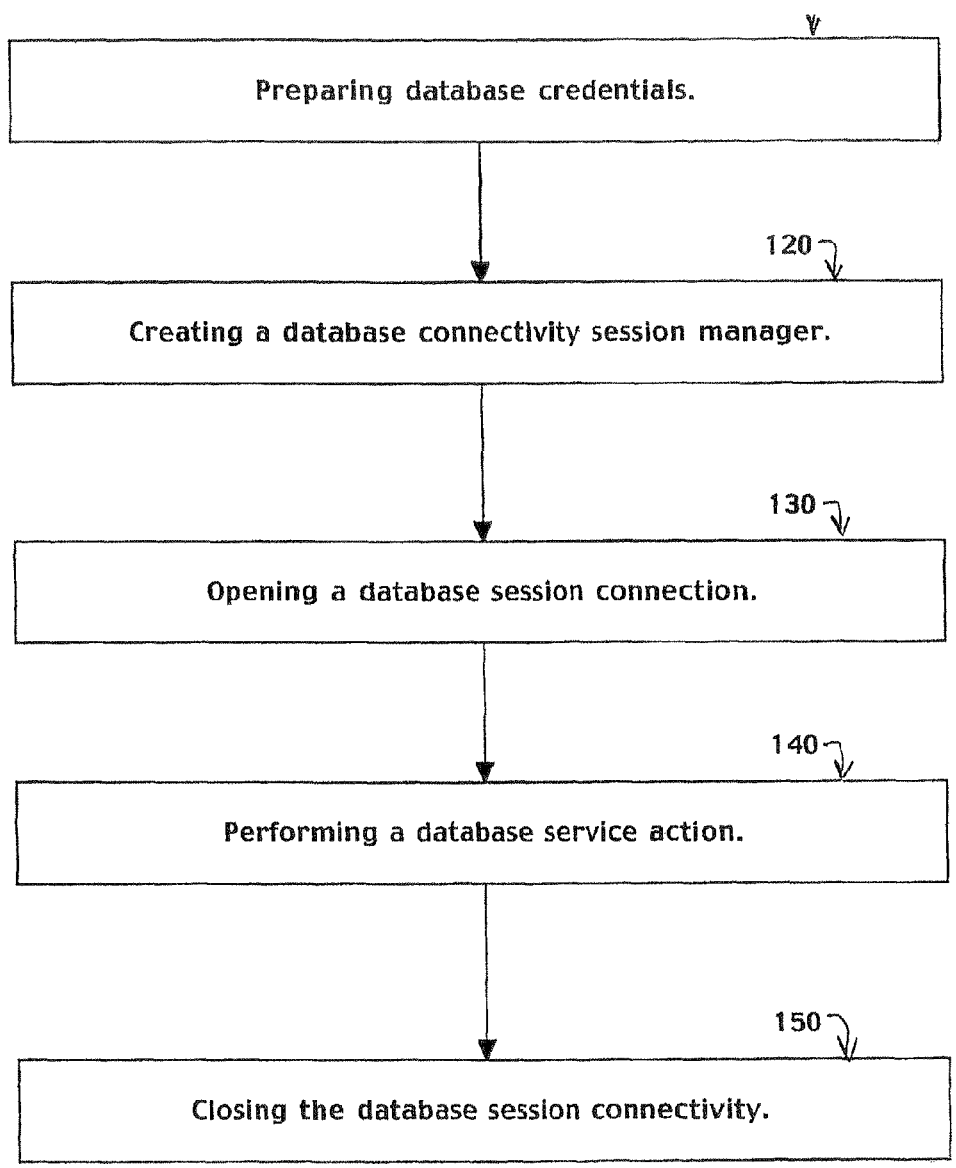
FIG. 1 is a flow chart of an automated database connectivity method, one embodiment of the present invention.

FIG. 1 is a flow chart of automated database connectivity method 100, one embodiment of the present invention. Automated database connectivity method 100 facilitates connectivity management and automated access to database information. In one embodiment of the present invention, automated database connectivity method 100 is part of a scaleable and cost-effective unified system and method implemented on a open platform for seamlessly streamlining, integrating and automating access to information in a variety of database configurations.

In step 110, database credentials are prepared. In one exemplary implementation, the database credentials include a username, a password, database schema information, and host identification (e.g., a uniform resource locator).

In step 120 a database connectivity session manager object is created. The session objects are responsible for controlling a session duration and tracking database session connectivity information. The database session management object provides a console for a user to indicate a desire to begin (e.g., open) or end (e.g., close) a database session connection.

A database session connection is opened in step 130 based upon said database connectivity session manager object. The database session connection is compatible with a variety of connectivity tool protocols (e.g., Java database connectivity (JDBC), open database connectivity (ODBC), Perl database modules, Rogue Wave database tools, and others). The database connectivity session manager object interacts with a database session object to generate function calls compatible with the different connectivity protocols.

At step 140 a database service action is performed. There are a variety of possible database activities or operations including query, update, create records, etc. For example, a query is made for database information related to a particular topic, a response is received and the results are ordered in a special sequence. In one exemplary implementation, a database service action is included in a database action process.

In step 150 the database session connectivity is closed. Again the database connectivity session manager object interacts with a database session object to generate function calls compatible with the different connectivity protocols.

Figure 2:
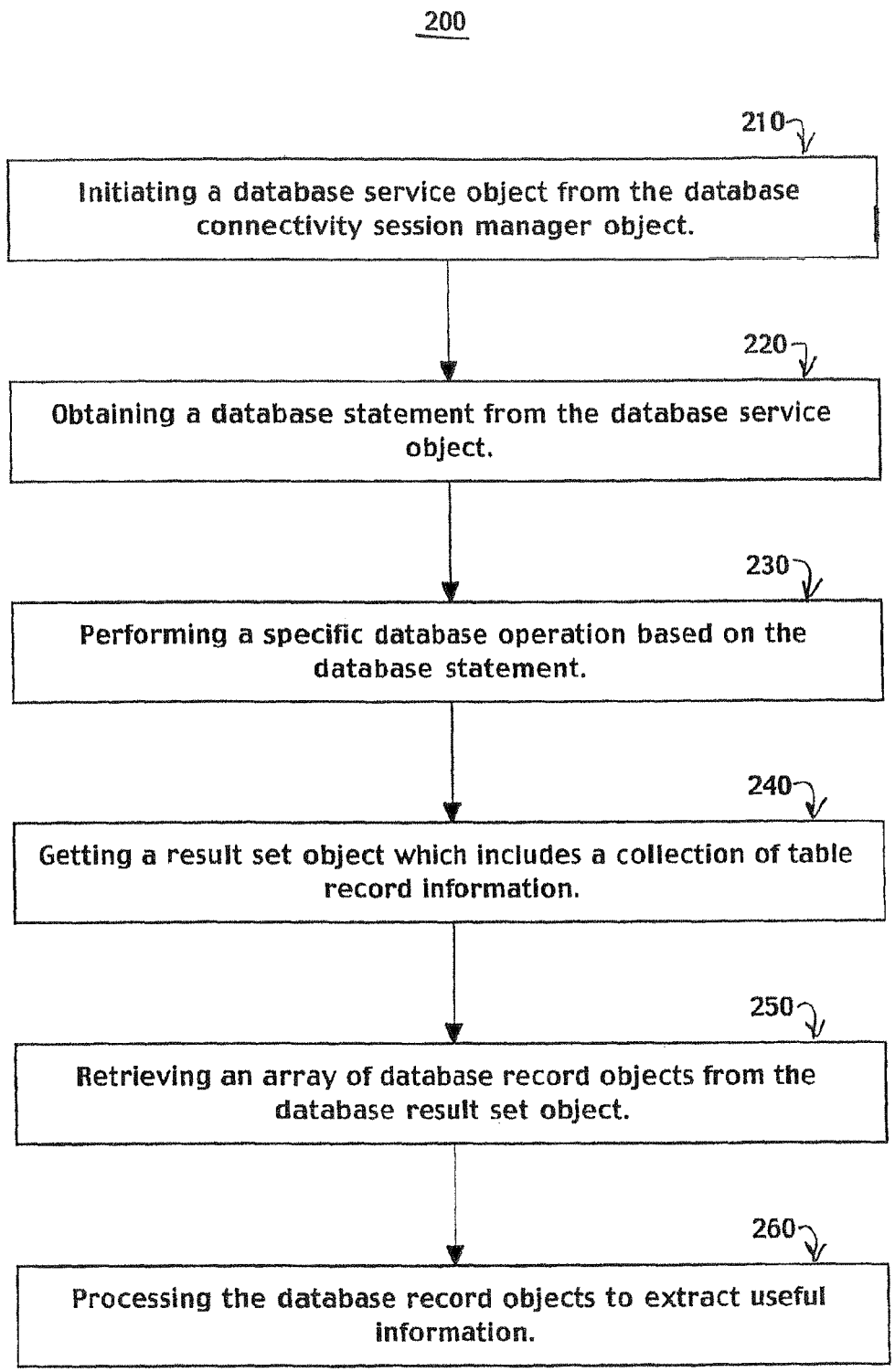
FIG. 2 is a flow chart of a database action process included in an automated database connectivity method in accordance with one embodiment of the present invention.

FIG. 2 is a flow chart of database action process 200, one embodiment of a present invention database action process included in automated database connectivity method 100. In step 210 a database service object is initiated from the database connectivity session manager object (e.g., the connectivity session manager object created in step 120 of automated database connectivity method 100 shown in FIG. 1). At step 220 a database statement is obtained from the database service object. A specific database operation is performed in step 230 based on said database statement. In step 240 an operation is performed to get a result set object which includes a collection of table record information. An array of database record objects is retrieved from the database result set object in step 250. In step 260 the database record objects are processed to extract useful information.

Figure 3:
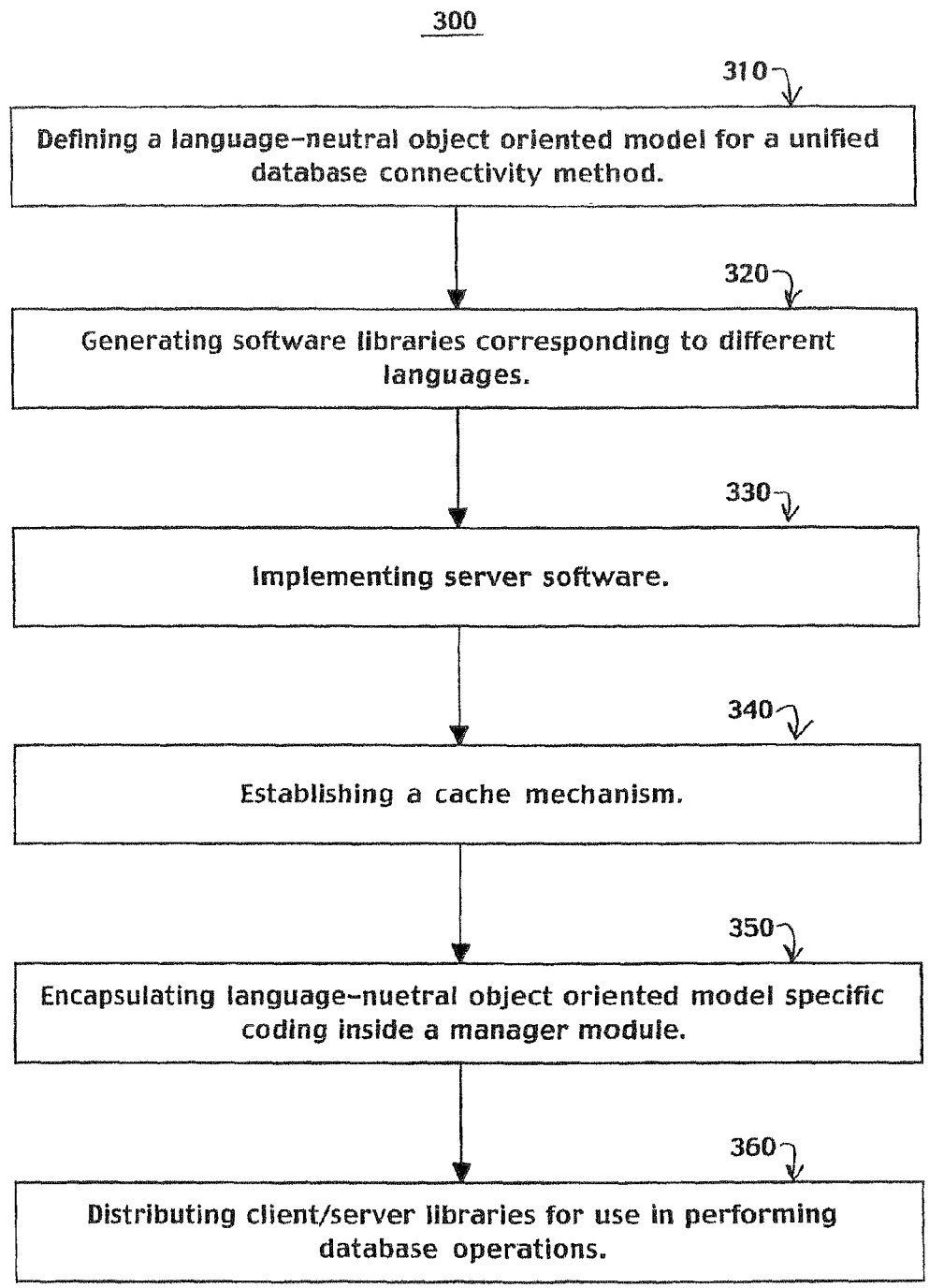
FIG. 3 is a flow chart of one embodiment of an automated database connectivity method implementation.

FIG. 3 is a flow chart of an automated unified connectivity implementation process 300, one embodiment of implementing automated database connectivity method 100.

In step 310, a language-neutral object oriented model is defined for the unified database connectivity method 100. In one embodiment the language-neutral object oriented model is compatible with the common object request broker architecture (CORBA) interface definition language (IDL), an open information technology standard. In one embodiment of the present unified database connectivity (UDBC) approach, CORBA IDL serves as a reference model for specific UDBC implementations.

At step 320, client stub and server skeleton software libraries are generated corresponding to different languages. In one embodiment the software libraries are compatible with various languages including Java Client, C/C++, COBOL applications, etc.

As a server software language is implemented in step 330. In one embodiment the server software language is compatible with unified database connectivity methods that are available and workable for a variety of different web and non-web applications. For example, a Java language that takes advantage of open and scaleable Java JDBC architecture implementations.

A cache mechanism is established in step 340. In one embodiment a Java hash table is utilized for UDBC cache implementation. For example, after a client application makes a database connection using the unified connectivity method, a unified database connectivity server checks whether or not the database connection is already in the server cache. If it is the client application gets the database connection directly from the server cache and performs database operations. Establishing the database connection, especially directly from cache, saves the application from performing establishment and tearing down of database connectivity, which in turn saves time.

In step 350, a language-neutral object oriented model specific coding is encapsulated inside a manager implementation. For example, encapsulating CORBA specific coding inside a management module enables different client applications to participate in the present UDBC approach without having CORBA information for the usage of the unified database connectivity method.

At step 360, server/client software libraries are distributed for use in performing database operations. In one embodiment, the libraries of database operation are constructed to be compatible with CORBA data communication Internet Inter—ORB protocol (IIOP).

Figure 4A:
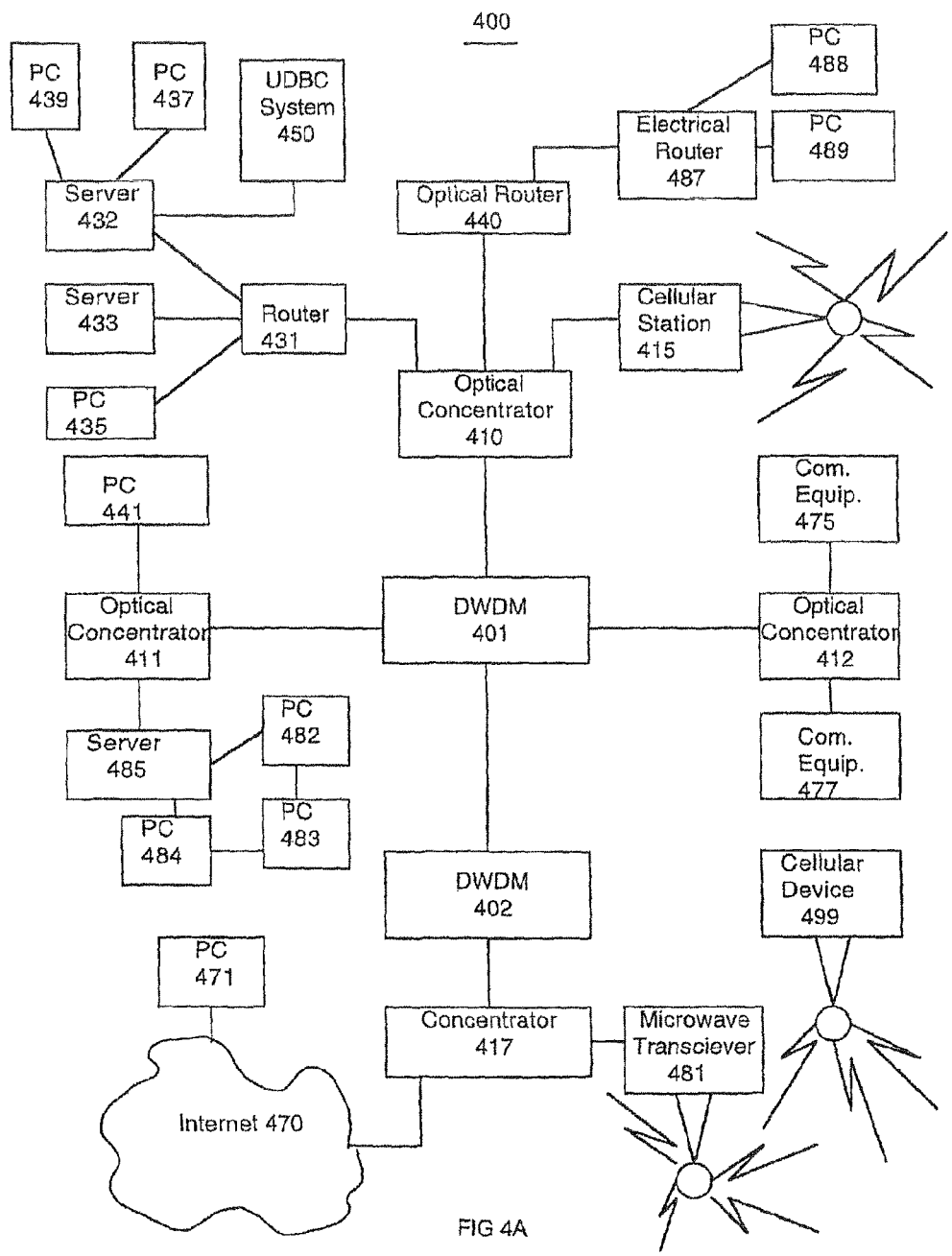
FIG. 4A is block diagram of a communications network utilized to implement one embodiment of the present invention.

In one embodiment, the present invention unified database connectivity methods are implemented on devices connected via a communication network. FIG. 4A is a block diagram of communication network 400. In one embodiment of the present invention, unified database connectivity method 100 is implemented via communications network 400. Communication network 400 comprises automated unified database connectivity system 450, dense wave division multiplexer (DWDM) 401 and 402, optical concentrators 410, 411, 412 and 417, routers 431, 440 and 487, cellular station 415, cellular device (e.g., phone, handheld computer, etc.) 499, microwave transceiver 481, Internet 470, servers 485, 432, 433 and 435, personal computers 437, 439, 441, 471, 482, 483, 484, 488 and 489, and miscellaneous communication equipment 475 and 477. The components of communications network 400 communicate with each other over a variety of architectures utilizing numerous communication protocols. One exemplary implementation of communications network 400 utilizes Fiber Distributed Data Interface (FDDI), Dynamic Packet Transport (DPT), Packet Over Sonet (POS), Asynchronous Transfer Mode (ATM), Ethernet, token ring, Transmission Control Protocol/Internet Protocol (TCP/IP), plain old telephone system (POTS), Cable, Digital Subscriber Line (DSL), etc.

Figure 4B:
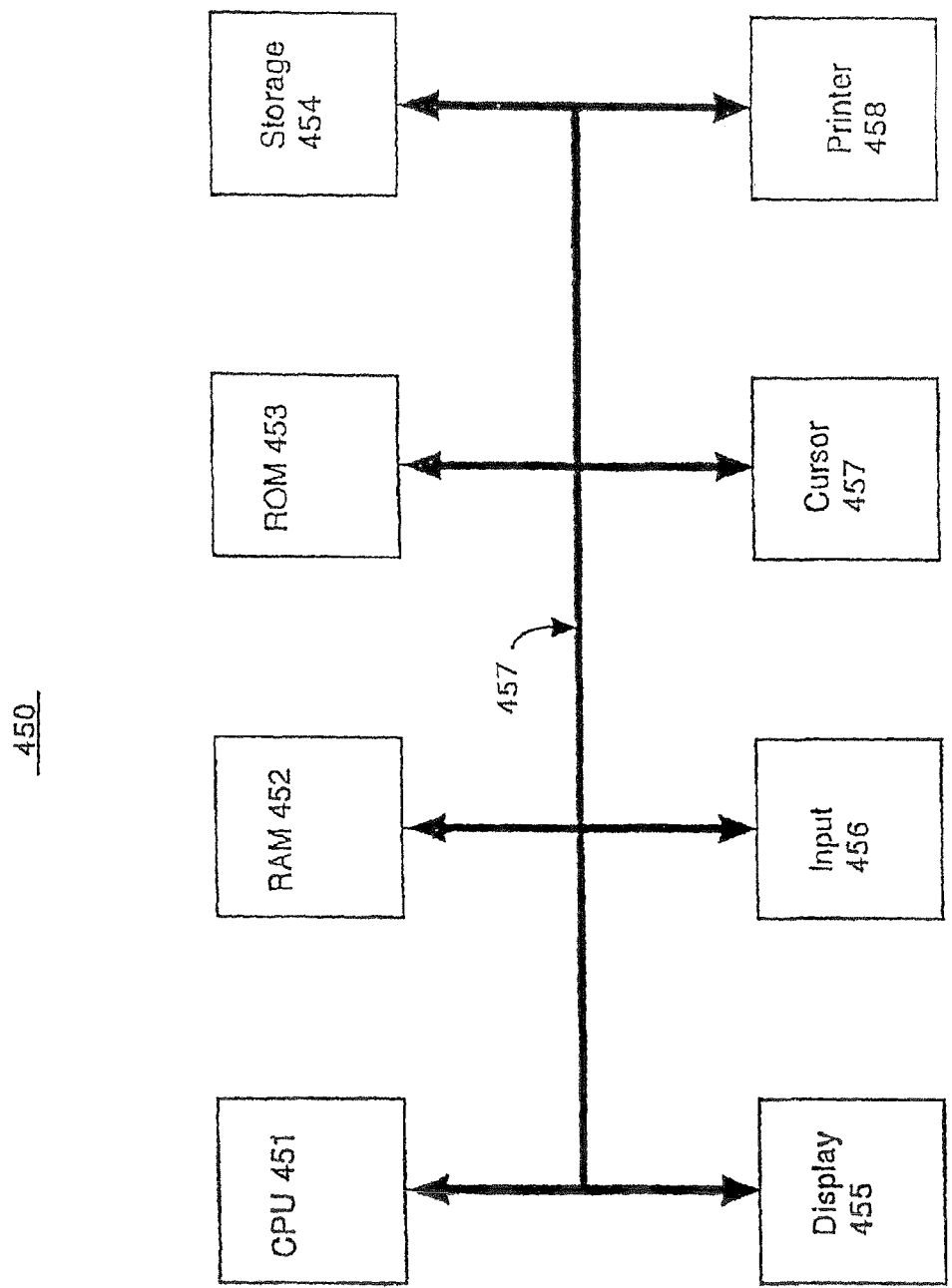
FIG. 4B is a block diagram of an exemplary automated unified database connectivity system in accordance with one embodiment of the present invention.

FIG. 4B is a block diagram of automated unified database connectivity system 450, one embodiment of a platform that performs automated connectivity method 100. In general, unified database connectivity system 450 comprises a bus 457, a central processor 451, a random access memory 452, a read only memory 453, a data storage device 454, a display device 455, an alphanumeric input device 456, a cursor control device 457 and a printer 458. Bus 457 is coupled to central processor 451, random access memory 452, read only memory 453, data storage device 454, display device 455, alphanumeric input device 456, cursor control device 457 and printer 458.

The components of automated unified database connectivity system 450 cooperatively operate to perform their designated functions. Central processor 451 processes information and instructions including instructions associated with automated unified database connectivity method 100. Random access memory 452 stores information and instructions for the central processor 451 including information and instructions associated with automated unified database connectivity method 100. Read only memory 453 stores static information and instructions for the processor 451. Data storage device 454 (e.g., such as a magnetic or optical disk and disk drive) provides bulk storage for storing information and instructions. Display device 455 displays information to a computer user. Alphanumeric input device 456 includes alphanumeric and function keys for communicating information and command selections to the central processor 451. Cursor control device 457 communicates user input information and command selections to the central processor 451. Printer 458 prints documents in accordance with directions from central processor 451. Bus 457 is a path for communicating information. The components of automated distribution network system 450 comprise a variety of interchangeable embodiments.

Figure 5:
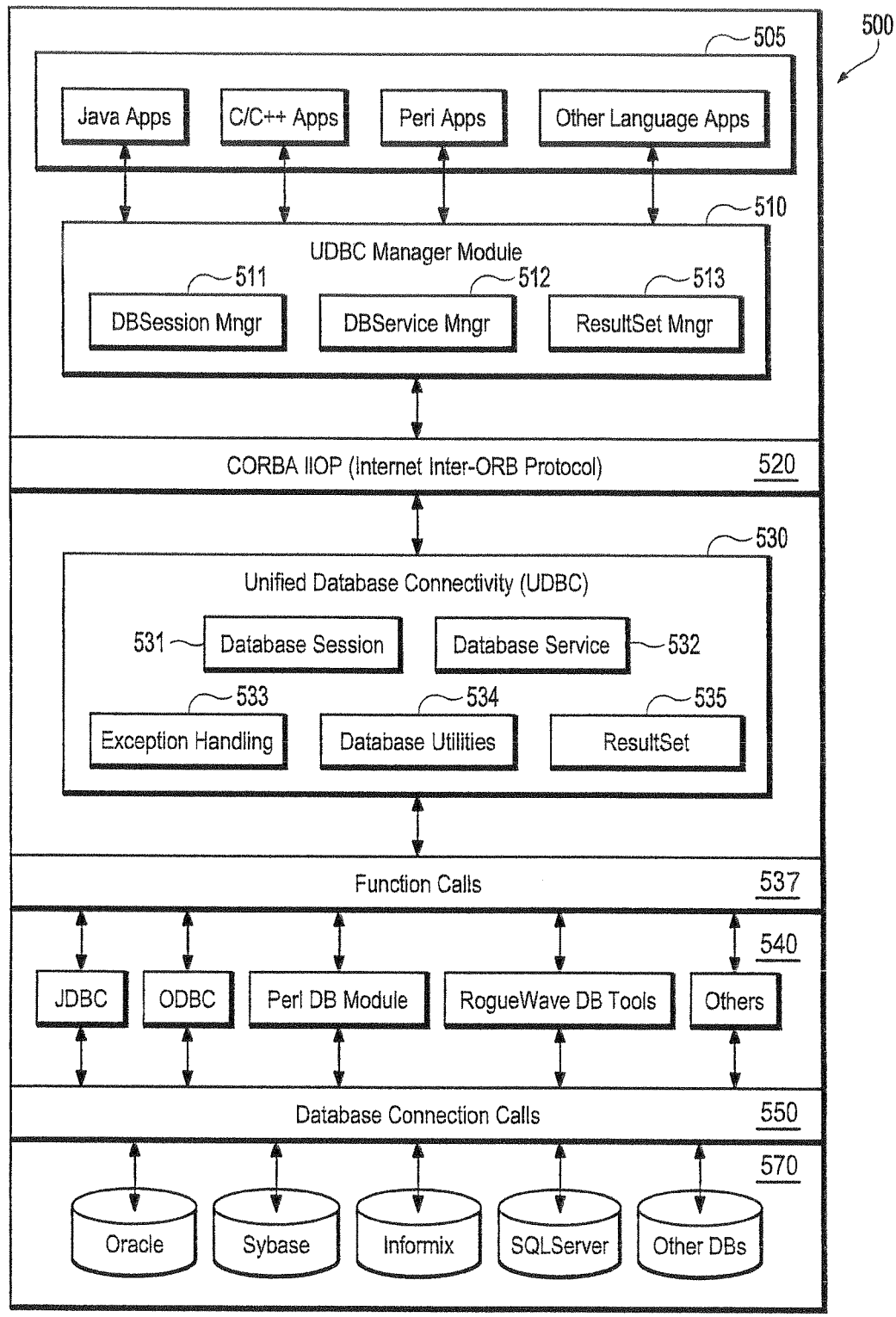
FIG. 5 is a block diagram of an object-oriented unified database connectivity architecture included in one embodiment of the present invention.

The present invention comprises a comprehensive object oriented software architecture that is flexibly adaptable (e.g., extensible, scaleable, etc.) to accommodate numerous features and variations of databases. FIG. 5 is a block diagram of object-oriented unified database connectivity architecture 500, one embodiment of the present invention. This architecture is utilized to facilitate automated connectivity to databases and access to database information. In one exemplary implementation of the present invention, connectivity architecture 500 objects facilitate convenient unified connectivity to a variety of different databases permitting easy and controlled access to large amounts of information associated with numerous database activities that may otherwise be independent and uncoordinated (such as software development, marketing, purchasing, licensing, delivery, etc.).

In one embodiment unified database connectivity architecture 500 is structured in several "layers" including an application layer 505, a unified database connectivity (UDBC) management layer 510, CORBA IIOP layer 520, unified database connectivity (UDBC) layer 530, function call layer 537 530, specific connectivity layer 540, database connection call layer 550, and database layer 570. Various applications (e.g., Java apps, C/C++ apps, Perl apps, other language apps etc.) run in the application layer 505. The applications utilize a UDBC manager module in the UDBC management layer 510 to interface via a CORBA IIOP through the CORBA IIOP layer 520 with UDBC modules (e.g., including UDBC objects) in the UDBC layer 530. The UDBC modules are utilized to form function calls in the function call layer 537 530 that direct the specific connectivity tools (e.g., JDBC, ODBC, Perl DB module, RogueWave DB tolls, other connectivity tools, etc.) of specific connectivity layer 540 to connect with specific databases (e.g., an Oracle database, a Sybase database, an Informix database, an SQLServer database, etc.) of database layer 570 via database connection call layer 550.

Figure 6:
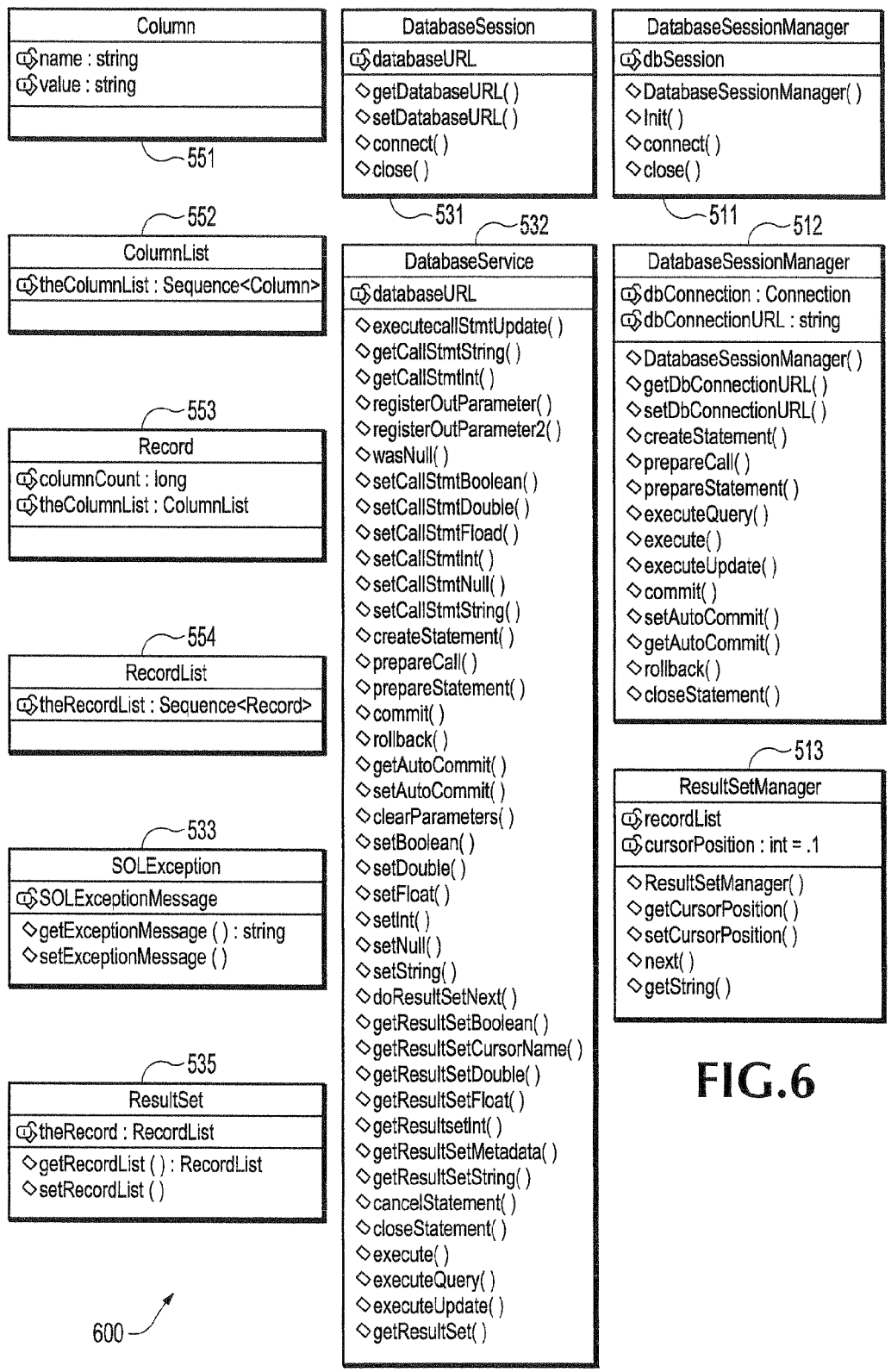
FIG. 6 is a block diagram of a Unified Modeling Language (UML) UML object model comprising designs for classes, attributes and operations included in one embodiment of the present invention.

In one embodiment of the present invention, unified connectivity modules manage the database session information and activities in accordance with models. FIG. 6 is a block diagram of UML object model 600, one embodiment of a present invention object model, including exemplary indications of classes, attributes and operations. The UML object model 600 stores and organizes various and complex information based on extensible tree-based data structures. The objects of UML object model 600 correspond to the objects of object-oriented connectivity architecture 500.

In general, object oriented software connectivity architecture 500 and UML object model 600 comprise the modules that manage different areas of information (e.g., database session information, database service information, exception handling information, database utility information, result set or query set information, etc.). In one embodiment of the present invention, some modules comprise a management component and a corresponding information component. The information components track database connectivity information. In one embodiment of the present invention, information objects are linked together by unique object identifiers. In one exemplary implementation, the management component functions as a console to facilitate management (e.g., create, update, delete, etc.) of the information components.

The session objects are responsible for controlling a session duration and tracking database session connectivity information. In one exemplary implementation the database session objects (e.g., "connect", "getDatabaseURL", "setDatabaseURL" and "close", etc.) are responsible for activities such as initiating database connectivity and closing unused database connectivity. In one exemplary implementation of the present invention, a database session manger module comprises a database session management object (e.g., DatabaseSessionManager). The database session management object provides a console for a user to indicate a desire to begin (e.g., open) or end (e.g., close) a database session connection.

The database service objects facilitate a variety of database read and write operations after the database session objects establish database connectivity. It can provide numerous Java data base connectivity (JDBC) methods (e.g., including callable statements), database connection specific methods, database metadata specific methods, prepared statement specific methods, result set specific methods, result set metadata specific methods, and statement specific methods, etc. In one embodiment, a database service management module logically stores and organizes information associated with database services. In one exemplary implementation, the database service management module includes a database session manger object (e.g., DatabaseServiceManager) that performs the storing and organization of information in a database service object. The database service management module includes an entry point object that provides an interface for a user to communicate with the database service management module. Based upon user input, the user entry point coordinates with the database service object to store and retrieve database information.

In one embodiment of the present invention the database service objects are arranged in categories. An exemplary callable statement category includes:
   void registerOutParameter(in long parameterindex, in long sqlType);
   void setCallStmtBoolean(in long parameterindex, in boolean x);
   void setCallStmtInt(in long parameterindex, in long x);
   void setCallStmtString(in long parameterindex, in string x);
which raise a (SQLException::SQLExceptionMessage) and call functions to assist database read and write operations. An exemplary connection specific category includes:
   void createStatement( );
   void prepare Call(in string sql);
   void commit( )
   void setAutoCommit(in boolean autoComit);
which raise a (SQLException::SQLExceptionMessage) and facilitate different ways of connecting to a database. An exemplary prepared statement category includes:
   void clearParametersO;
   void setCallStmtBoolean(in long parameterindex, in boolean x);
   void setCallStmtInt(in long parameterindex, in long x);
   void setCallStmtString(in long parameterindex, in string x);
which raise a which raise a (SQLException::SQLExceptionMessage) and facilitate runtime preparations of complicated database function calls.

The result set objects 535 are responsible for special sequence of database query results and their manipulation. In one embodiment, the "ResultSet" interface is defined as a sequence of "RecordList"s to represent a collection of query results. It has one attribute called as "theRecordList" as "RecordList" data type and its two methods "getRecordList ( )" and "setRecordList( )". Exemplary "ResultSet" objects or methods include:
   boolean doResultSetNext( )
   boolean doResultSetBoolean(in string columnName)
   string get ResultSetCursorName( )
   float getResultSetFloat (in string cloumnName
   long getResultSetInt (in string columnName
   void getResultSetMetaData( )
   string getResultSetString (instringcolumnName)
which raise a (SQLException::SQLExceptionMessage) and assist manipulation of database query results for placement in a special sequence.

The exception objects are responsible for handling execution scenarios which result from database connectivity operations. In FIG. 6, SQLEXception CORBA interface 533 is defined to represent any runtime database operation errors. It has one attribute called "SQLExceptionMessage" and two methods "getExceptionMessage( )" and "setExceptionMessage( )". In addition, a method of UDBC DatabaseSession and DataService objects indicate a SQLException message whenever there is something wrong with its method execution and operation.

In one embodiment the present invention includes auxiliary objects. The auxiliary objects assist various unified database connectivity activities and work together as an integrated unit. Referring still to FIG. 6, "Column" auxiliary data type 551 is defined as a pair of names and its value to represent each data element in the database. For example, column name="SSN" (Social Security), column value="555-76-7898". The "ColumnList" auxiliary data type 552 is defined as a sequence or a collection of data elements in the tables. The "Record" auxiliary data type 553 is defined to represent one row of any database table. The "RecordList" auxiliary data type 554 is defined to represent defined as a sequence of "Records" to represent a collection of database rows.

Thus, the present invention is a system and method that facilitates streamlining of unified database connectivity management activities. The present invention facilitates efficient and convenient interaction by permitting flexible connection to a combination of various types of databases and access to the database information. The utilization of a comprehensive unified object oriented architecture enables extensible and scaleable implementations to accommodate numerous features and activities associated with a variety of databases.

The present invention utilizes a language-neutral unified approach to extend a highly scalable and open architecture (e.g., Java JDBC) that is available for a variety of applications, including Java, C/C++, COBOL, and PERL by using CORBA architecture and its open IIOP data communication protocol. By taking advantage of CORBA object persistence and a cache mechanism to maximize application performance (e.g., Java hash tables), applications are relieved of the major overhead associated with establishing and tearing down database connectivity. In one embodiment, deployment and utilization a present unified database connectivity method in a distributed information technology infrastructure is facilitated by CORBA's object-oriented distributed architecture based on its IIOP communication protocol. The present invention can be built and implemented using a variety of information technology industry standards (e.g., the CORBA architecture and it's IIOP protocol, Java JDBC, SQL, etc.) without using otherwise proprietary database tools (e.g., C/C++, Rouge Wave,) permitting compatibility with a variety of database products. Furthermore, the same process of database connectivity applies to both Java and non-Java applications in web and non-web IT environments enabling the present invention to lay down an IT foundation for the establishment of a unified enterprise architecture across different business function units for various computer platforms (e.g., Unix, MS Windows, Linux, etc.).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. A computer-readable memory device storing instructions that, when executed by at least one processing device, cause the processing device to:
   define a language-neutral object oriented model;
   generate software libraries corresponding to different software languages;
   utilize the language-neutral object oriented model and the software libraries to communicate with client applications implementing the different software languages;
   receive a request for access to a database from at least one of the client applications; and
   issue one or more function calls that direct connectivity tools corresponding to the database to connect with the database corresponding to the request, where the function calls are configured to direct the connectivity tools to open a session with the database, track information associated with connectivity of the session, receive a result set from the database for the at least one client application, and close the session with the database.

2. The computer-readable memory device of claim 1, wherein the language-neutral object oriented model is compatible with Common Object Request Broker Architecture (CORBA) Interface Definition Language (IDL).

3. The computer-readable memory device of claim 2, wherein CORBA specific information is encapsulated within a management module.

4. The computer-readable memory device of claim 2, wherein the software libraries are constructed to be compatible with CORBA data communication Internet Inter-ORB Protocol (IIOP).

5. The computer-readable memory device of claim 1, wherein the software libraries are compatible with a variety of different software languages.

6. The computer-readable memory device of claim 1, wherein a server software language is compatible with a variety of web and non-web applications.

7. The computer-readable memory device of claim 1, wherein the instructions, when executed, cause the processing device to store information corresponding to a connection with the database in a cache mechanism.

8. The computer-readable memory device of claim 7, wherein the instructions, when executed, cause the processing device to check the cache mechanism to determine whether there is an existing connection with the database in response to the request, and to issue one or more function calls that direct connectivity tools corresponding to the database to access the database through the existing connection a client application obtains information directly from the cache mechanism.

9. An apparatus comprising:
   means for defining a language-neutral object oriented model;
   means for generating software libraries corresponding to different software languages;
   means for utilizing the language-neutral object oriented model and the software libraries to communicate with client applications implementing the different software languages;
   means for receiving a request for access to a database from at least one of the client applications; and
   means for issuing one or more function calls that direct connectivity tools corresponding to the database to connect with the database corresponding to the request, where the function calls are configured to direct the connectivity tools to open a session with the database, track information associated with connectivity of the session, receive a result set from the database for the at least one client application, and close the session with the database.

10. The apparatus of claim 9, wherein the language-neutral object oriented model is compatible with Common Object Request Broker Architecture (CORBA) Interface Definition Language (IDL).

11. The apparatus of claim 10, wherein CORBA specific information is encapsulated within a management module.

12. The apparatus of claim 10, wherein the software libraries are constructed to be compatible with CORBA data communication Internet Inter-ORB Protocol (IIOP).

13. The apparatus of claim 9, further comprising means for storing information corresponding to a connection with the database in a cache mechanism.

14. The apparatus of claim 13, further comprising means for checking the cache mechanism to determine whether there is an existing connection with the database in response to the request, wherein the means for issuing is configured to issue one or more function calls that direct connectivity tools corresponding to the database to access the database through the existing connection.

15. A method comprising:
   defining a language-neutral object oriented model;
   generating software libraries corresponding to different software languages;
   utilizing the language-neutral object oriented model and the software libraries to communicate with client applications implementing the different software languages;
   receiving a request for access to a database from at least one of the client applications; and
   issuing one or more function calls that direct connectivity tools corresponding to the database to connect with the database corresponding to the request, where the function calls are configured to direct the connectivity tools to open a session with the database, track information associated with connectivity of the session, receive a result set from the database for the at least one client application, and close the session with the database.

16. The method of claim 15, wherein the language-neutral object oriented model is compatible with Common Object Request Broker Architecture (CORBA) Interface Definition Language (IDL).

17. The method of claim 16, wherein CORBA specific information is encapsulated within a management module.

18. The method of claim 16, wherein the software libraries are constructed to be compatible with CORBA data communication Internet Inter-ORB Protocol (IIOP).

19. The method of claim 15, wherein the software libraries are compatible with a variety of different software languages.

20. The method of claim 15, wherein a server software language is compatible with a variety of web and non-web applications.

* * * * *

UNITED STATES PATENT AND TRADEMARK OFFICE
CERTIFICATE OF CORRECTION

| | | |
|---|---|---|
| PATENT NO. | : 7,953,756 B1 | Page 1 of 1 |
| APPLICATION NO. | : 12/048192 | |
| DATED | : May 31, 2011 | |
| INVENTOR(S) | : Johnson Jiahui Qin | |

It is certified that error appears in the above-identified patent and that said Letters Patent is hereby corrected as shown below:

On Title page 1, bibliographic data section (75), please replace "Johnson Ji Ahui Qin" with --Johnson Jiahui Qin--.

On page 13, column 9, (claim 8), beginning line 55, please replace "access the database through the existing connection a client application obtains information directly from the cache mechanism." with --access the database through the existing connection.--

Signed and Sealed this
Fifth Day of July, 2011

David J. Kappos
*Director of the United States Patent and Trademark Office*